(12) United States Patent
Zhao et al.

(10) Patent No.: US 12,252,645 B2
(45) Date of Patent: Mar. 18, 2025

(54) FORMULATION AND SETUP METHOD OF IN-SITU DISSOLVABLE PLUG

(71) Applicants: CNPC USA CORP., Houston, TX (US); BEIJING HUAMEI, INC., Beijing (CN); CHINA NATIONAL PETROLEUM CORPORATION, Beijing (CN)

(72) Inventors: Lei Zhao, Houston, TX (US); Jiaxiang (Jason) Ren, Houston, TX (US); Jianpeng Yue, Houston, TX (US); Peng Cheng, Houston, TX (US)

(73) Assignees: CNPC USA CORPORATION, Houston, TX (US); BEIJING HUAMEI, INC., Beijing (CN); CHINA NATIONAL PETROLEUM CORPORATION, Beijing (CN)

( * ) Notice: Subject to any disclaimer, the term of this patent is extended or adjusted under 35 U.S.C. 154(b) by 0 days.

(21) Appl. No.: 18/359,432

(22) Filed: Jul. 26, 2023

(65) Prior Publication Data

US 2025/0043169 A1    Feb. 6, 2025

(51) Int. Cl.
*E21B 33/13*     (2006.01)
*C09K 8/42*      (2006.01)
*C09K 8/44*      (2006.01)

(52) U.S. Cl.
CPC ............. *C09K 8/426* (2013.01); *C09K 8/44* (2013.01); *E21B 33/13* (2013.01); *E21B 2200/08* (2020.05)

(58) Field of Classification Search
CPC ... E21B 2200/08; E21B 33/13; C09K 8/4256; C09K 8/44
See application file for complete search history.

(56) References Cited

U.S. PATENT DOCUMENTS

| | | | |
|---|---|---|---|
| 4,665,986 A * | 5/1987 | Sandiford | C09K 8/592 166/272.5 |
| 7,093,664 B2 | 8/2006 | Todd et al. | |
| 9,617,462 B2 | 4/2017 | Tashiro et al. | |
| 9,677,372 B2 | 6/2017 | Smith et al. | |
| 10,458,197 B2 | 10/2019 | Khatiwada et al. | |
| 2017/0030161 A1 | 2/2017 | Frazier | |
| 2018/0245448 A1* | 8/2018 | Fripp | E21B 47/06 |
| 2018/0363409 A1* | 12/2018 | Frazier | E21B 33/128 |
| 2020/0190914 A1 | 6/2020 | Stark | |
| 2020/0347694 A1* | 11/2020 | Power | E21B 33/129 |
| 2021/0253773 A1* | 8/2021 | Ren | B29B 7/726 |
| 2022/0042393 A1* | 2/2022 | Jacob | E21B 33/1285 |
| 2023/0022703 A1 | 1/2023 | Zhao et al. | |
| 2023/0117648 A1* | 4/2023 | Dunne | C25D 11/30 428/632 |
| 2023/0323015 A1* | 10/2023 | Zhao | C08J 3/24 523/400 |
| 2024/0263065 A1* | 8/2024 | Abad | E21B 43/267 |

* cited by examiner

*Primary Examiner* — Taras P Bemko
(74) *Attorney, Agent, or Firm* — Frank Gao, Esq.

(57) ABSTRACT

The patent application discloses a plug useable for isolating sections of a wellbore. The in-situ dissolvable plug comprises a cylindrical body having a backup piece at least at one end of the cylindrical body, a tube and a cylindrical body. The tube may extend through the cylindrical body and backup piece. The cylindrical body may be made of dissolvable material comprising an external surface, and an inner bore surface formed around the tube. The cylindrical body is soft, moldable, and expandable vertical to the tube to form an in-situ plug at downhole.

4 Claims, 7 Drawing Sheets

FORMULATION AND SETUP METHOD OF IN-SITU DISSOLVABLE PLUG

TECHNICAL FIELD AND INDUSTRIAL APPLICABILITY

The invention disclosure relates to a packer or plug in oil and gas field, in particular, a formulation and setup method of in-situ dissolvable plug.

BACKGROUND

Embodiments described generally relate to downhole tools. More particularly, embodiments described relate to downhole tools that are set within a wellbore with a lower shear mechanism.

DESCRIPTION OF THE RELATED ART

Bridge plugs, packers, and frac plugs are downhole tools that are typically used to isolate one wellbore zone permanently or temporarily from another. Such isolation is often necessary to pressure test, perforate, frac, or stimulate a zone of the wellbore without impacting or communicating with other zones within the wellbore. To reopen and/or restore fluid communication through the wellbore, plugs are typically removed or otherwise compromised.

Permanent, non-retrievable plugs and/or packers are typically drilled or milled to remove. Most non-retrievable plugs are constructed of a brittle material such as cast iron, cast aluminum, ceramics, or engineered composite materials, which can be drilled or milled. Problems sometimes occur, however, during the removal or drilling of such non-retrievable plugs. For instance, the non-retrievable plug components can bind upon the drill bit, and rotate within the casing string. Such binding can result in extremely long drill-out times, excessive casing wear, or both. Long drill-out times are highly undesirable, as rig time is typically charged by the hour.

In use, non-retrievable plugs are designed to perform a particular function. A bridge plug, for example, is typically used to seal a wellbore such that fluid is prevented from flowing from one side of the bridge plug to the other. On the other hand, drop ball plugs allow for the temporary cessation of fluid flow in one direction, typically in the downhole direction, while allowing fluid flow in the other direction. Depending on user preference, one plug type may be advantageous over another, depending on the completion and/or production activity.

Certain completion and/or production activities may require several plugs run in series or several different plug types run in series. For example, one well may require three bridge plugs and five drop ball plugs, and another well may require two bridge plugs and ten drop ball plugs for similar completion and/or production activities. Within a given completion and/or production activity, the well may require several hundred plugs and/or packers depending on the productivity, depths, and geophysics of each well. The uncertainty in the types and numbers of plugs that might be required typically leads to the over-purchase and/or under-purchase of the appropriate types and numbers of plugs resulting in fiscal inefficiencies and/or field delays.

Deformed casing has been found to be a severe issue during hydraulic fracturing when the high-pressure fracturing fluid is pumped into the wellbore. The casing, which is the pipe that lines the wellbore, can deform or even rupture under the pressure. There are many reasons behind deformed casing. One of them is related to geology, and also impossible to address, i.e., the presence of weak rock formations, natural fractures or faults, or other geologic hazards can create excessive pressure or stress on the casing, leading to deformation or failure. Once casing is deformed during previous stage of fracturing, a plug cannot be delivered to the position of next stage due to reduced ID of casing (i.e., plug is stuck at the kink of deformed casing).

There is a need, therefore, for a plug that can effectively seal the wellbore at wellbore conditions; be quickly, easily, and/or reliably removed from the wellbore; and configured in the field to perform one or more functions.

SUMMARY

In one aspect, one embodiment discloses an in-situ dissolvable plug useable for isolating sections of a wellbore. The in-situ dissolvable plug comprises a cylindrical body having a backup piece at least at one end of the cylindrical body, a tube and a cylindrical body. The tube may extend through the cylindrical body and backup piece. The cylindrical body may be made of dissolvable material comprising an external surface, and an inner bore surface formed around the tube. The cylindrical body is soft, moldable, and expandable vertical to the tube to form an in-situ plug at downhole.

Optionally in any aspect, the backup piece is expandable vertical to the tube upon a trigger action.

Optionally in any aspect, the dissolvable material comprises polymer materials.

Optionally in any aspect, the polymer materials comprise a reaction product of an epoxy resin mixture, a cross-linker, a degradation catalyst, and a fiber enhancement.

Optionally in any aspect, the degradation catalyst is a controlled release catalyst.

Optionally in any aspect, the degradation catalyst is capped by a shell.

Optionally in any aspect, the plug comprises a first axis, wherein the tube has a second axis, wherein the first axis and the second axis coincide.

Further in another aspect, one embodiment discloses an in-situ manufactured plug for isolating zones in a well. The plug may comprise a distal end backup piece; a proximate end backup piece; and a cylindrical body. The cylindrical body may be located between the distal end backup piece and the proximate end backup piece. The cylindrical body is made of dissolvable material comprising an external surface. The distal end backup piece and the proximate end backup piece may be expandable vertically and move horizontally so as to squeeze the dissolvable material to expand vertically to form an in-situ plug.

Optionally in any aspects, the in-situ manufactured plug may further comprise a tube connected through the proximate end backup piece, the distal end backup piece, and the cylindrical body.

Optionally in any aspects, the cylindrical member may be made of polymer materials.

Optionally in any aspects, the plug comprises a first axis, wherein the tube has a second axis, wherein the first axis and the second axis coincide.

In yet another aspect, one embodiment discloses a method of forming an in-situ plug. The method may comprise steps of admixing an epoxy, a degradation catalyst, and a cross-linker to form a curable composition; mixing with fibers to make raw materials; B staging the raw materials at low temperature to achieve high viscosity; deforming under a compressive load to form a shape of deformed casing; and starting another cross-linking reaction to form a fiber enhanced thermoset composite plug in-situ.

Optionally in any aspect, viscosity enhancer or thicker agent includes at least one of ZnO, $Al_2O_3$, $ZrO_2$, clay, fume silica, $TiO_2$ powder.

Optionally in any aspect, the epoxy resin mixture may further comprise cycloaliphatic epoxy.

Optionally in any aspect, the cross-linker comprises a high temperature cross-linker and a low temperature cross-linker.

Optionally in any aspect, the cross-linker works at high temperature.

BRIEF DESCRIPTION OF THE DRAWINGS

The foregoing summary, as well as the following detailed description of the embodiments, will be better understood when read in conjunction with the appended drawings. It should be understood that the embodiments depicted are not limited to the precise arrangements and instrumentalities shown.

DETAILED EMBODIMENTS

Definitions

Unless otherwise indicated, all numbers expressing quantities of ingredients, properties such as size, weight, reaction conditions and so forth used in the specification and claims are to the understood as being modified in all instances by the term "about". Accordingly, unless indicated to the contrary, the numerical parameters set forth in the following specification and attached claims are approximations that may vary depending upon the desired properties sought to be obtained by the invention. At the very least, and not as an attempt to limit the application of the doctrine of equivalents to the scope of the claims, each numerical parameter should at least be construed in light of the number of reported significant digits and by applying ordinary rounding techniques.

The term "about" means plus or minus 20%, more preferably plus or minus 10%, even more preferably plus or minus 5%, most preferably plus or minus 2%.

The invention is not limited to the particular methodology, protocols, and reagents described herein because they may vary. Further, the terminology used herein is for the purpose of describing particular embodiments only and is not intended to limit the scope of the present invention. As used herein and in the appended claims, the singular forms "a," "an," and "the" include plural reference unless the context clearly dictates otherwise.

Unless defined otherwise, all technical and scientific terms and any acronyms used herein have the same meanings as commonly understood by one of ordinary skill in the art in the field of the invention. Although any methods and materials similar or equivalent to those described herein can be used in the practice of the present invention, the preferred methods, devices, and materials are described herein.

All percentages for weights expressed herein are by weight of the total food product unless specifically stated otherwise.

The technical means, creative features, objectives, and effects of the patent application may be easy to understand, the following embodiments will further illustrate the patent application. However, the following embodiments are only the preferred embodiments of the utility patent application, not all of them. Based on the examples in the implementation manners, other examples obtained by those skilled in the art without creative work shall fall within the protection scope of the present invention. The experimental methods in the following examples are conventional methods unless otherwise specified. The materials and reagents used in the following examples can be obtained from commercial sources unless otherwise specified.

Exemplary Embodiments

Herein disclosed are novel apparatuses, systems, and methods that pertain to downhole tools usable for wellbore operations, details of which are described herein.

The plug may be suitable for frac operations. In an exemplary embodiment, the plug may be a composite frac plug made of degradable material, the plug being suitable for use in vertical or horizontal wellbores.

Broadly, the present embodiment discloses method or design to form in-situ dissolvable plug with a unique formulation and processing that enable plug forming and dissolving functions.

Figure 1A:
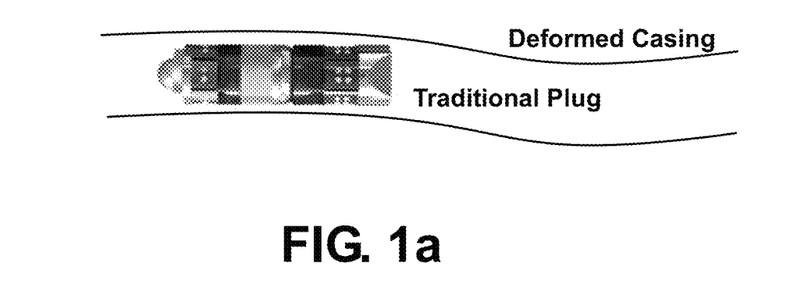
FIG. 1(a) is a prior art schematic showing that a traditional plug may not work at a deformed casing underground during oil and gas exploration.

Casing pipes or patching pipes under an oil, gas well are always subject to deformation, wearing and diameter reduction during their use as a result of corrosion and crust movement, so that the well cannot work properly by using a traditional plug as show FIG. 1(a).

Figure 1B:
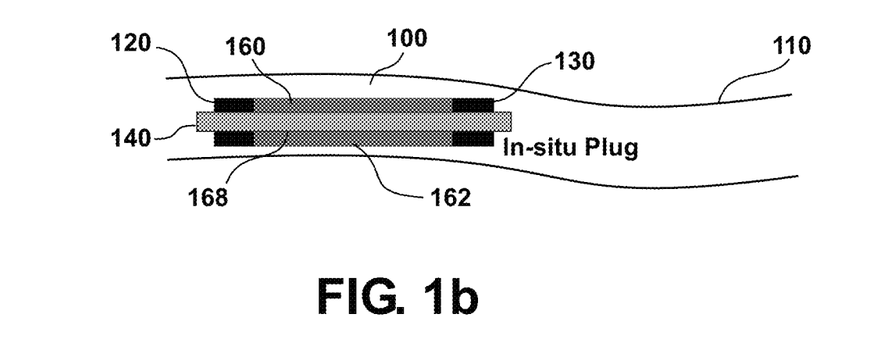
FIG. 1(b) illustrates a schematic showing an in-situ dissolvable plug is passing through in the deformed casing without getting stuck in the deformed casing according to one embodiment.

As shown in FIG. 1(b), a plug 100 useable for isolating sections of a wellbore 110 may comprise a cylindrical body 160 having a backup piece 120 or 130 at least at one end of the cylindrical body 160; and a tube 140 extends through the cylindrical body 160 and backup piece 120 or 130. The cylindrical body 160 is made of dissolvable material. The cylindrical body 160 may comprise an external surface 162, and an inner bore surface 168 formed around the tube 140, wherein the cylindrical body is soft, moldable, and expandable vertical to the tube to form an in-situ manufactured plug.

In another embodiment, the plug 100 may have a distal end backup piece 120, a proximate end backup piece 130, a tube 140, and a cylindrical body 160.

The tube 140 may extend from the distal end backup piece 120 to the proximate end backup piece 130. The cylindrical body 160 between the distal end backup piece 120 and the proximate end backup piece 130. The cylindrical body 160 is made of a dissolvable material, such as a polymer material. The cylindrical body 160 may comprise an external surface 162, and an inner bore surface 168 formed around the tube 140.

Downhole tools according to embodiments disclosed herein may include one or more anchor slips, one or more compression cones engageable with the slips, and a compressible seal element disposed therebetween, all of which may be configured or disposed around a plug. The plug may include a flow bore open to an end of the tool and extending to an opposite end of the tool. Thus, the plug may be suitable for frac operations. In an exemplary embodiment, the plug may be a composite frac plug made of degradable material, the plug being suitable for use in vertical or horizontal wellbores.

A plug useable for isolating sections of a wellbore may include having a first set of threads and a second set of threads (not shown). The plug may include a degradable member disposed about the plug and in engagement with a seal element also disposed about the plug. In accordance with the disclosure, the degradable member may be partially deformable. For example, upon application of a load, a portion of the degradable member, such as a resilient portion, may withstand the load and maintain its original shape and configuration with little to no deflection or deformation. At the same time, the load may result in another portion, such as a deformable portion, that experiences a deflection or deformation, to a point that the deformable portion changes shape from its original configuration and/or position.

The plug may include a first slip disposed about the plug and configured for engagement with the dissolvable member, such as Mg alloy or Al alloy, for example. In an embodiment, the first slip may engage the angled surface of a resilient portion of the degradable member. The plug may further include a cone piece disposed about the plug. The cone piece may include a first end and a second end, wherein the first end may be configured for engagement with the seal element. The plug may also include a second slip, which may be configured for contact with the cone. In an embodiment, the second slip may be moved into an engagement or compression with the second end of the cone during setting. In another embodiment, the second slip may have a one-piece configuration with at least one groove or undulation disposed therein.

In accordance with embodiments of the disclosure, setting of the plug in the wellbore may include the first slip and the second slip in gripping engagement with a surrounding tubular or wellbore 110, the seal element sealingly engaged with the surrounding wellbore 110, and/or application of a load to the plug sufficient enough to shear one of the sets of the threads.

Any of the slips may be composite material or metal (e.g., Mg alloy or Al alloy). Any of the slips may include gripping elements, such as inserts, buttons, teeth, serrations, etc., configured to provide gripping engagement of the tool with a surrounding surface, such as the tubular. In an embodiment, the second slip may include a plurality of inserts disposed therearound. In some aspects, any of the inserts may be configured with a flat surface, while in other aspects any of the inserts may be configured with a concave surface (with respect to facing toward the wellbore).

The plug (or tool components) may include a longitudinal axis, including a central long axis. During setting of the downhole tool, the deformable portion, such as the proximate end backup piece or the distal end backup piece may expand or "flower", such as in a radial direction away from the axis. Setting may further result in the degradable member and the seal element compressing together to form a reinforced seal or barrier therebetween. In embodiments, upon compressing the seal element, the seal element may partially collapse or buckle around an inner circumferential channel or groove disposed therein.

In an embodiment, one of the sets of threads on the plug 100 may be shear threads. In other embodiments, one of the sets of threads may be shear threads disposed along a surface of the bore at the proximate end. In yet other embodiments, one of the sets of threads may be rounded threads. For example, one of the sets of threads may be rounded threads that are disposed along an external mandrel surface, such as at the distal end. The round threads may be used for assembly and setting load retention.

The plug may be coupled with a setting adapter configured with corresponding threads that mate with the first set of threads. In an embodiment, the adapter may be configured for fluid to flow therethrough. The plug may also be coupled with a sleeve configured with corresponding threads that mate with threads on the end of the plug. In an embodiment, the sleeve may mate with the second set of threads. In other embodiments, setting of the plug may result in distribution of load forces along the second set of threads at an angle that is directed away from an axis.

In embodiments, an e-line or wireline mechanism may be used in conjunction with deploying and/or setting the tool. There may be a pre-determined pressure setting, where upon excess pressure produces a tensile load on the plug that results in a corresponding compressive force indirectly between the plug and a setting sleeve. The use of the stationary setting sleeve may result in one or more slips being moved into contact or secure grip with the surrounding tubular, such as a casing string, and also a compression (and/or inward collapse) of the degradable materials. The distal end backup piece and proximate end backup piece may expand vertical to the tube upon this trigger action, such as this compression. The axial compression of the degradable materials may be (but not necessarily) essentially simultaneous to its radial expansion outward and into sealing engagement with the surrounding the wellbore 110 with the external surface 162 in line with the wellbore 110. To disengage the tool from the setting mechanism (or wireline adapter), sufficient tensile force may be applied to the plug to cause mated threads therewith to shear. Alternatively, the degradable material may degrade in a certain time frame, such as a week or two, for example.

Figure 2A:
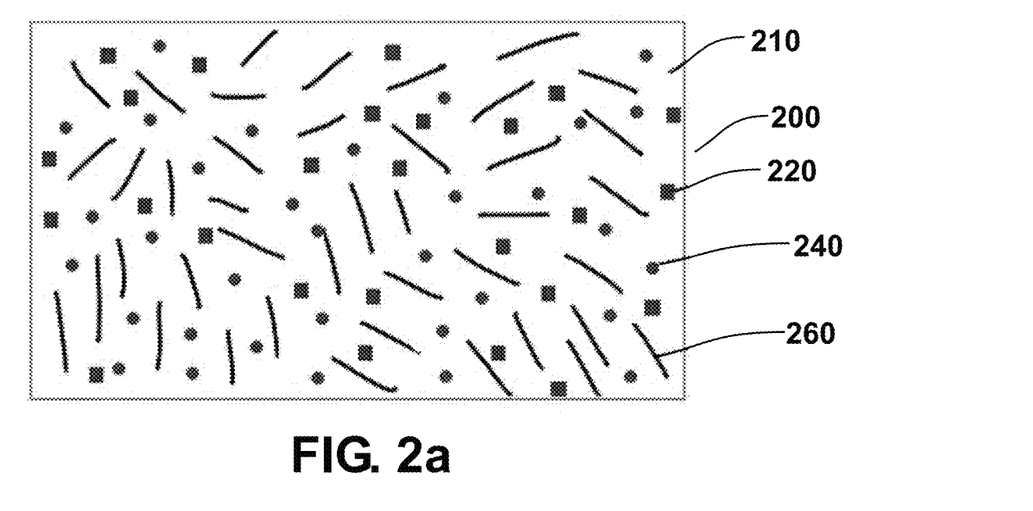
FIG. 2(a) shows schematic illustration of degradable composite putty microstructure according to one embodiment.

The polymer materials 200 may comprise a reaction product of an epoxy resin mixture 210, a cross-linker 220, a degradation catalyst 240, and a fiber enhancement 260.

Epoxy resins are one of the most widely used engineering resins, and are well-known for their use in composites with high strength fibers. Epoxy resins form a glassy network, exhibit excellent resistance to corrosion and solvents, good adhesion, reasonably high glass transition temperatures, and adequate electrical properties.

The impact strength, fracture toughness, ductility, as well as most other physical properties of crosslinked epoxy resins may be controlled by the chemical structure and ratio of the epoxy resin and cross-linker, by any added macroscopic fillers, toughening agents, and other additives, and by the curing conditions used. Typical performance requirements of thermoset resins, including epoxies, include a high softening point (>200° C.), low flammability, hydrolytic resistance, chemical and solvent resistance, and dielectric rigidity.

Performance criteria for the compositions during storage, cure, and for the thermoset resins formed from epoxies vary.

Despite the fact that degradable polymers or polymer composites are commercially available in fabrication of various downhole tools including degradable plug, they are mainly thermoplastics with temperature rating lower than 80° C. That cannot meet the needs in developing ultra-deep shale well with downhole temperature easily above 130° C. Thermoset polymers with high temperature rating are good candidates to meet this market. However, there is rarely any degradable thermoset polymer material reported able to survive that harsh condition except cyanate ester composite developed by Baker Hughes. However, cyanate ester has extremely high cost and is also brittle in nature. To address this issue, cost-efficient epoxy material, such as ester, or polyester, with high flexibility in material selections are extremely appealing.

For plug application, not only does it require a high glass transition temperature (Tg) for high temperature wells, but also needs degradation at relatively lower temperature, a contradicting requirements that cannot be met by any single epoxy materials. Because high Tg epoxy resin can hardly degrade at low temperature.

In one aspect, embodiments disclosed herein relate to curable compositions and thermoset resins formed from such curable compositions. The curable compositions, for example, may include an admixture of aromatic epoxy resins. Cross-linkers used in the curable compositions may include, for examples, cycloaliphatic anhydrides. In a family of embodiments, curable compositions disclosed herein may include an admixture of a) an aromatic epoxy resin; b) a catalyst; and c) one or more cycloaliphatic anhydride cross-linkers. The aromatic epoxy resin may further include an epoxy phenolic novolac resin, an epoxy bisphenol A novolac resin, a multifunctional epoxy resin, a bisphenol-A based epoxy resin, or a combination thereof.

Upon cure, such as a thermal cure, the resulting thermoset resins may have a good balance of physical properties, including a high glass transition temperature, a high tensile strength, a high tensile modulus, and degrading at low temperature in the water and salt.

A degradable thermoset composite may comprise a reaction product of an admixture of epoxy resin mixture, a cross-linker, and a degradation catalyst. The degradable thermoset composite may have a tensile modulus of at least about 145000 psi in some embodiments. The aromatic epoxy resin may comprise an epoxy phenolic novolac resin, an epoxy bisphenol A novolac resin, a multifunctional epoxy resin, a bisphenol-A based epoxy resin, or combination thereof.

As shown in FIG. 2(a), solid base or acid is used as catalyst (dots) 240 to accelerate degradation rate, and fibers 260 (e.g., glass, carbon fiber, aramid fibers, Kevlar, etc.) can be used as structural enhancement to make the so called fiber-polymer composites.

The disclosed invention embodiment provides a formulation to make cost-efficient degradable epoxy composites that can perform over 110° C. as temporary blocking tool, while degrades at lower temperature below 100° C. when the tools are no longer needed. That is the typical requirements to make downhole degradable plugs used in hydraulic fracturing ultra-deep and high temperature wells. So far, no polymer based degradable plug can achieve this in the market due to their low temperature rating (<80° C.).

Thermoset resins disclosed herein may have a glass transition temperature (Tg) of at least 150° C. in some embodiments, as measured by differential scanning calorimetry (DSC) or dynamic mechanical thermal analysis (DMTA; as per ASTM D5045). In other embodiments, thermoset resins disclosed herein may have a glass transition temperature of at least 175° C.; at least 200° C. in other embodiments; at least 210° C. in other embodiments; at least 220° C. in other embodiments; at least 224° C. in other embodiments; at least 225° C. in other embodiments; and at least 226° C. in yet other embodiments.

Thermoset resins disclosed herein may have a tensile modulus of at least 145000 psi, as measured according to ASTM D638, in some embodiments. In other embodiments, thermoset resins disclosed herein may have a tensile modulus of at least 146000 psi; at least 150000 psi in other embodiments; at least 160000 psi in other embodiments; and at least 170000 psi in yet other embodiments.

Thermoset resins disclosed herein may have a tensile strength of at least 10000 psi, as measured according to ASTM D638, in some embodiments. In other embodiments, thermoset resins disclosed herein may have a tensile strength of at least 12000 psi; at least 13000 psi in other embodiments; at least 14000 psi in other embodiments; and at least 15000 psi in yet other embodiments.

Thermoset resins disclosed herein may have an elongation at break of at least 1 percent, as measured according to ASTM D638, in some embodiments. In other embodiments, thermoset resins disclosed herein may have an elongation at break of at least 1.5 percent; at least 2 percent in other embodiments; at least 2.5 percent in other embodiments; and at least about 3 percent in yet other embodiments.

Microstructure of the advanced composite system is shown in FIG. 2(a), the background 210 represents resin matrix that have degradable group on polymer backbones. These groups include but not limited to cyanate ester group, ester group, etc. Chopped fiber 260 is used to enhance mechanical strength of fully cross-linked polymer composites. Resin without fiber enhancement typically exhibit low strength, <<10 ksi, not enough to take load during hydraulic fracturing. By introducing short fibers, strength can be boosted above 20 ksi at room temperature and proven to be enough for plugs. Degradable rate of resin matrix is usually slow, so degradation-accelerating agents 220 illustrated in FIG. 2(a) is added to enable complete degradation within 2 weeks as required by field application.

Figure 2B:
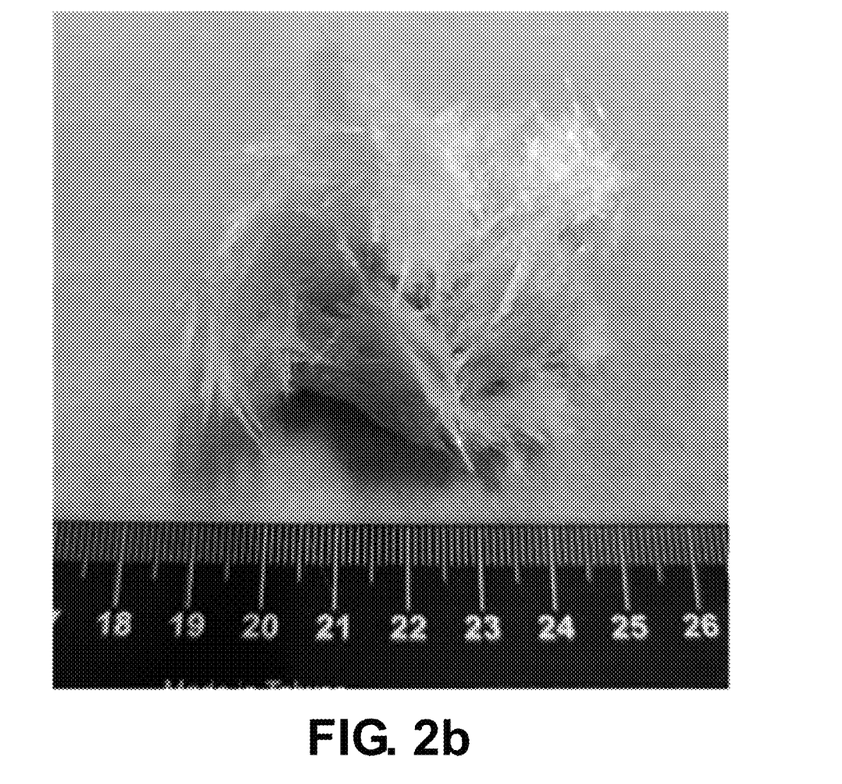
FIG. 2(b) shows products after "B stage" treatment according to one embodiment.
Figure 2C:
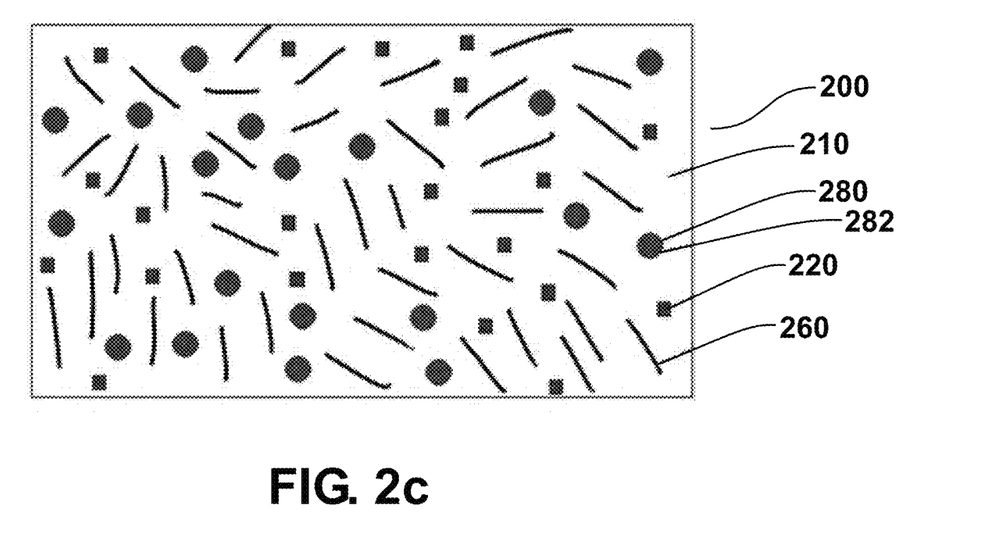
FIG. 2(c) shows schematic illustration of degradable composite putty microstructure according to another embodiment.

In one embodiment, at least 2 stage of cross-linking may be required to realize this present disclosure. The first stage of cross-linking enables a putty like polymer composite with high viscosity as shown in FIG. 2(b), so it can keep its physical shape during plug delivery process, and deform to cater to casing during setup. Second stage is a complete cross-linking process that activated after plug installation. To achieve this complex reaction process, a unique catalysts system is introduced and will be illustrated in detail later (degradation catalyst 240 in FIG. 2(a)). Another method to realize this process may be using a controlled release catalyst, such as a core-shell catalyst as shown in FIG. 2(c). Degradation catalyst 280 may be capped by a shell 282. During the setting process, composite/degradable polymer is under compressive load, and the shell may be broken to release degradation catalyst 280 to trigger cross-linking process.

Figure 3:
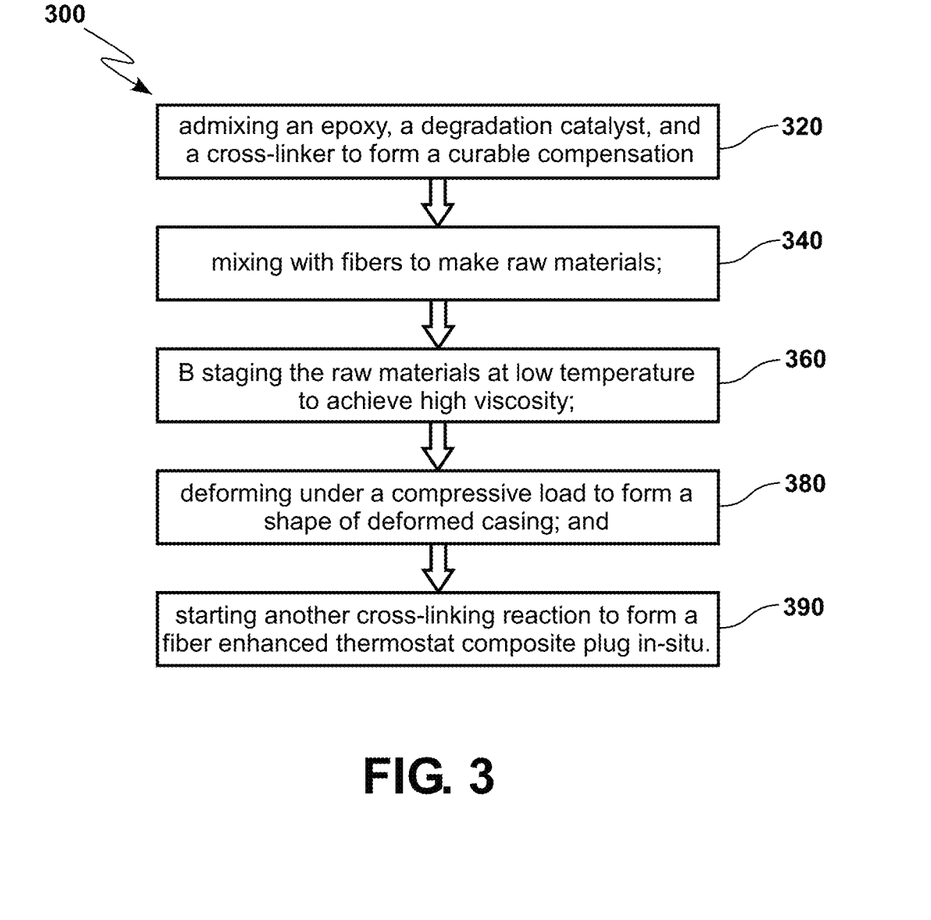
FIG. 3 illustrates a flow chart of method of making in-situ degradable plug according to one embodiment.

More specifically, as shown in FIG. 3, a process 300 for forming an in-situ dissolvable plug may comprise steps of admixing an epoxy, a degradation catalyst, and a cross-linker to form a curable composition in a step 320; mixing with fibers to make raw materials in a step 340; B staging the raw materials at low temperature to achieve high viscosity in a step 360; deforming under a compressive load to form a shape of deformed casing in a step 380; and starting another cross-linking reaction to form a fiber enhanced thermoset composite plug in-situ in a step 390. The steps 320, 340 and 360 may be performed/finished on the ground. Steps 380 and 390 may be performed downhole in-situ. Optionally in any embodiment, the epoxy comprises at least one cycloaliphatic epoxy.

To maintain mechanical strength at high temperature, in the step 320, content of epoxy may be as high as about 90 wt %, about 80 wt %, about 70 wt %, about 60 wt %, about 50 wt %, for example. Furthermore, cross-linkers (acid anhydride), and solid catalyst powders are added and mix them evenly, the amount of cross-linker and solid catalyst is dependent on the requirement for degradation rate. Stoichiometric ratio between epoxy and cross-linker is typical used, up to 30% off is also accepted or used to tune mechanical strength. Weight ratio between organic resin (including cross-linker) and catalyst is between about 5:1 to about 2:1.

The method 300 may further include a step of adding viscosity enhancer or thicker agents, such as ZnO, $Al_2O_3$, $ZrO_2$, clay, fume silica, $TiO_2$ powder, for example, to increase viscosity.

With standard industrial method, fibers, such as glass fibers, carbon fibers, aramid fibers, for example, are then introduced inside to make so called bulk molding compound or sheet molding. The fiber volume loading may be between about 20% to about 60%, depending on the mechanical strength requirement. Finally, these raw materials are cured under low temperature and pressure to achieve high viscosity (e.g., hot press process), formed so called fiber-enhanced composite parts.

Figure 1C:
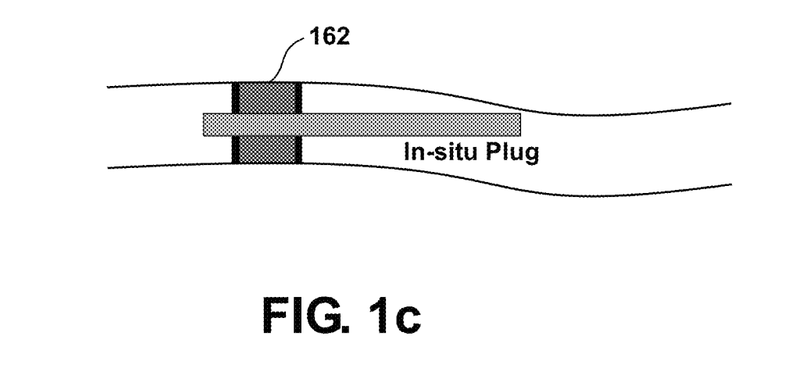
FIG. 1(c) depicts the in-situ dissolvable plug expanded to fit the contour of the deformed casing after cure according to one embodiment.

More specifically, all the fillers or additives are blended with resin material to form even resin mixture, fibers are then introduced and blended to make a putty like polymer composite raw material. Polymer resin viscosity is typically low, and that of result putty is also typically low (100-1,000 cP). To prevent extrusion during a setup process, viscosity has to be at least 100,000 cP. To achieve this, viscosity of resin can be increased by adding viscosity enhancer or thicker agents, such as clay, fume silica, $TiO_2$ powder, etc., and also needs to be pre-crosslinked before "gel point", a process named "B stage". Detailed methods are introduced in later section. The resulting material is of high strength, but ductile or deformable under high load. Such material is then loaded in the in-situ plug tool and delivered to a targeting position. Then it is forced to "flow" or deform plastically like "putty" under compressive load to cater to irregular shapes of deformed casing as shown in FIG. 1(c). In the final step, the compete cross-linking reaction is triggered, activated by pressing or downhole temperature, to form a strong fiber enhanced composite piece that could block wellbore. After hydraulic fracturing, polymer composite can degrade with 2 weeks thanks to existence of degradation accelerating agents.

As described above, curable compositions and thermoset resins may be formed from an epoxy resin mixture, including a mixture of aromatic epoxy resins or a mixture of at least a flexibilized epoxy resin with a bisphenol-A based epoxy resin and a cycloaliphatic anhydride cross-linker. Other epoxy resins, additional cross-linkers, catalysts, toughening agents, flame retardants, and other additives may also be used in compositions disclosed herein. Each of these is described in more detail below.

Flexibilized Epoxy Resin

Flexibilized epoxy resins useful in embodiments disclosed herein may include epoxy resins modified with glycols, such as an aliphatic epoxy modified with polypropylene glycol; epoxidized polybutadiene; epoxidized caprolactones and caprolactones, silicone resin containing epoxy functionality; and epoxy vinyl ester resins, among others.

In some embodiments, flexibilized epoxy resins may include bis(3,4-epoxy-6-methylcyclohexylmethyl) adipate; bis(3,4-epoxycyclohexyl) adipate (available as ERL-4299 from The Dow Chemical Company, Midland, Mich.). In other embodiments, flexibilized epoxy resins may include (3'-4'-epoxycyclohexane)methyl 3'-4'-epoxycyclohexyl-carboxylate modified ξ-caprolactone (available as CELLOXIDE 2080 series from Daicel Chemical Industries, Ltd, Japan).

Other flexibilized epoxy resins may include polymeric epoxies include linear polymers having terminal epoxy groups (a diglycidyl ether of a polyoxyalkylene glycol, for example), polymer skeletal oxirane units (polybutadiene polyepoxide, for example) and polymers having pendant epoxy groups (such as a glycidyl methacrylate polymer or copolymer, for example.)

Other flexibilized epoxy resins may include glycidated resins, epoxidized oils, and so forth. The glycidated resins are frequently the reaction product of epichlorohydrin and a bisphenol compound, such as bisphenol A; C4 to C28 alkyl glycidyl ethers; C2 to C28 alkyl- and alkenyl-glycidyl esters; C1 to C28 alkyl-, mono- and poly-phenol glycidyl ethers; polyglycidyl ethers of polyvalent phenols, such pyrocatechol, as resorcinol, hydroquinone, 4,4'-dihydroxydiphenyl methane (or bisphenol F), 4,4'-dihydroxy-3,3'-dimethyldiphenyl methane, 4,4'-dihydroxydiphenyl dimethyl methane (or bisphenol A), 4,4'-dihydroxydiphenyl methyl methane, 4,4'-dihydroxydiphenyl cyclohexane, 4,4'-dihydroxy-3,3'-dimethyldiphenyl propane, 4,4'-dihydroxydiphenyl sulfone, and tris(4-hydroxyphynyl) methane; polyglycidyl ethers of the chlorination and bromination products of the above-mentioned diphenols; polyglycidyl ethers of novolacs; polyglycidyl ethers of diphenols obtained by esterifying ethers of diphenols obtained by esterifying salts of an aromatic hydrocarboxylic acid with a dihaloalkane or dihalogen dialkyl ether; polyglycidyl ethers of polyphenols obtained by condensing phenols and long-chain halogen paraffins containing at least two halogen atoms. Other examples of epoxy resins useful in embodiments disclosed herein include bis-4,4'-(1-methylethylidene) phenol diglycidyl ether and (chloromethyl) oxirane Bisphenol A diglycidyl ether.

Still other epoxy-containing materials are copolymers of acrylic acid esters of glycidol such as glycidylacrylate and glycidylmethacrylate with one or more copolymerizable vinyl compounds. Examples of such copolymers are 1:1 styrene-glycidylmethacrylate, 1:1 methylmethacrylate-glycidylacrylate and a 62.5:24:13.5 methylmethacrylate-ethyl acrylate-glycidylmethacrylate.

Other flexibilized epoxy may include cycloaliphatic epoxy or acyclic aliphatic epoxy, for example.

Since main function of flexibilized epoxy is providing high dissolving or degrading rate, high Tg is not required. To improve dissolving or degrading rate, there are two strategies. One is epoxy with linear polymer chains, and another strategy is to choose epoxy with an ester group in polymer chain. For practical application in plug market, this category of epoxy should be cost efficient, safe/easy processing, and commercially available in large scale. The following selections provides samples that can meet those requirements:

1. Polyglycidyl Ether of Substituted Glycerin

2. Phthalic Acid Diglycidyl Ester

3. Dimer acid diglycidyl ester

Novolac Resins and Multifunctional Epoxy Resins

Epoxy phenolic novolac resins useful in embodiments disclosed herein may include condensates of phenols with formaldehyde that are obtained under acid conditions, such as phenol novolacs, bisphenol A novolacs, and cresol novolacs.

Suitable multi-functional (polyepoxy) compounds may include resorcinol diglycidyl ether (1,3-bis-(2,3-epoxypropoxy)benzene), triglycidyl p-aminophenol (4-(2,3-epoxypropoxy)-N,N-bis(2,3-epoxypropyl) aniline), triglycidyl ether of meta- and/or para-aminophenol (3-(2,3-epoxypropoxy) N, N-bis(2,3-epoxypropyl) aniline), and tetraglycidyl methylene dianiline (N, N, N',N'-tetra(2,3-epoxypropyl) 4,4'-diaminodiphenyl methane), and mixtures of two or more polyepoxy compounds. A more exhaustive list of useful epoxy resins may be found in Lee, H. and Neville, K., *Handbook of Epoxy Resins*, McGraw-Hill Book Company, 1982 reissue.

Other suitable epoxy resins include polyepoxy compounds based on aromatic amines and epichlorohydrin, such as N,N'-diglycidyl-aniline; N,N'-dimethyl-N, N'-diglycidyl-4,4'-diaminodiphenyl methane; N,N, N',N'-tetraglycidyl-4,4'-diaminodiphenyl methane; N-diglycidyl-4-aminophenyl glycidyl ether; and N, N,N',N'-tetraglycidyl-1,3-propylene bis-4-aminobenzoate. Epoxy resins may also include glycidyl derivatives of one or more of: aromatic diamines, aromatic monoprimary amines, aminophenols, polyhydric phenols, polyhydric alcohols, polycarboxylic acids.

Such epoxy resins may include epoxy terminated polyoxazolidone-containing compounds, including, for example, the reaction product of a polyepoxide compound with a polyisocyanate compound. Polyepoxides may include diglycidyl ether of 2,2-bis(4-hydroxyphenyl) propane (generally referred to as bisphenol A) and diglycidyl ether of 2,2-bis (3,5-dibromo-4-hydroxyphenyl) propane (generally referred to as tetrabromobisphenol A). Suitable polyisocyanates include 4,4'-methylene bis(phenylisocyanate) (MDI) and isomers thereof, higher functional homologs of MDI (commonly designated as "polymeric MDI"), toluene diisocyanate (TDI) such as 2,4-toluene diisocyanate and 2,6-toluene diisocyanate, m-xylylene diisocyanate, hexamethylene diisocyanate (HMDI) and isophoronediisocyanate.

Examples of epoxy phenolic novolac resins, epoxy bisphenol A novolac resins and multifunctional epoxy resins useful in various embodiments disclosed herein may include phenol-formaldehyde novolacs, such as those available under the tradenames D.E.N. 431 and D.E.N. 438 available from The Dow Chemical Company, Midland, Mich., and EPON SU-8, available from Hexion Specialty Chemicals.

Bisphenol A and Bisphenol F Based Epoxy Resins

Other epoxy resins that may be used in various embodiments disclosed herein include 4,4'-dihydroxydiphenyl dimethyl methane (or bisphenol A), bis(4-hydroxyphenyl) methane (known as bisphenol F), diglycidyl ether of bromobisphenol A (2,2-bis(4-(2,3-epoxypropoxy) 3-bromophenyl) propane), diglycidyl ether of BisphenolF(2,2-bis(p-(2,3-epoxypropoxy)phenyl) methane), and other epoxy resins based on bisphenol A and bisphenol F. Bisphenol-A based epoxy resins may include, for example, diglycidyl ethers of bisphenol A; D.E.R.332, D.E.R. 383, and D.E.R. 331 from the Dow Chemical Company, Midland, Mich. Bisphenol-F based epoxy resins may include, for example, diglycidyl ethers of bisphenol-F, as well as D.E.R. 354 and D.E.R. 354LV, each available from the Dow Chemical Company, Midland, Mich.

Useful epoxy resins include, for example, polyglycidyl ethers of polyhydric polyols, such as ethylene glycol, triethylene glycol, 1,2-propylene glycol, 1,5-pentanediol, 1,2, 6-hexanetriol, glycerol, and 2,2-bis(4-hydroxy cyclohexyl) propane; di- or polyglycidyl ethers of polyhydric alcohols such as 1,4-butanediol, or polyalkylene glycols such as polypropylene glycol, polyhydric phenols include resorcinol, 2,2-bis(4'-hydroxy-3',5'-dibromophenyl) propane, 1,1, 2,2-tetrakis(4'-hydroxy-phenyl) ethane, polyglycidyl ethers of aliphatic and aromatic polycarboxylic acids, such as, for example, oxalic acid, succinic acid, glutaric acid, terephthalic acid, 2,6-naphthalene dicarboxylic acid, and dimerized linoleic acid; polyglycidyl ethers of polyphenols, such as, for example, 1,1-bis(4-hydroxyphenyl) ethane, 1,1-bis(4-hydroxyphenyl) isobutane, and 1,5-dihydroxy naphthalene; modified epoxy resins with acrylate or urethane moieties; glycidylamine epoxy resins; and novolac resins.

Since the targeting working temperature is from about 110° C. to about 175° C., for application in plug market, the category of epoxy should also be cost-efficient, safe/easy processing, and commercially available in large scale. The following selections provides samples that can meet those requirements:

Various trademarks of epoxy resins based on bisphenol A diglycidyl (BADGE) ether are EPON® resin series, D.E.R® series, Epotuff® series, Araldite® series, EPI-Rez® series, and the ERL Bakelite® epoxy series Polyglycidyl Ethers of Phenolic Novolacs and Polyglycidyl Ethers of Cresolic Novolacs

Aromatic Glycidyl Amines

Anhydride Cross-linker

Curable compositions disclosed herein may include one or more cycloaliphatic anhydride cross-linkers. Cycloaliphatic anhydride cross-linkers may include, for example, nadic methyl anhydride, hexahydrophthalic anhydride, trimellitic anhydride, dodecenyl succinic anhydride, phthalic anhydride, methyl hexahydrophthalic anhydride, tetrahydrophthalic anhydride, and methyl tetrahydrophthalic anhydride, among others. Anhydride curing agents may also include copolymers of styrene and maleic acid anhydrides and other anhydrides.

Most commercially available acid anhydride that is easy to process and cost efficient. The samples may include:

Additional Epoxy Resins

Additional epoxy resins may be used to tailor the properties of the resulting thermoset resins as desired. The additional epoxy resin component may be any type of epoxy resin, including any material containing one or more reactive oxirane groups, referred to herein as "epoxy groups" or "epoxy functionality." Additional epoxy resins useful in embodiments disclosed herein may include mono-functional epoxy resins, multi- or poly-functional epoxy resins, and combinations thereof. Monomeric and polymeric epoxy resins may be aliphatic, aromatic, or heterocyclic epoxy resins. The epoxies may be pure compounds, but are generally mixtures or compounds containing one, two or more epoxy groups per molecule. In some embodiments, epoxy resins may also include reactive-OH groups, which may react at higher temperatures with anhydrides, organic acids, amino resins, phenolic resins, or with epoxy groups (when catalyzed) to result in additional crosslinking.

Additional Cross-linkers/Curing Agents

In addition to the dicyandiamide cross-linkers described above, additional cross-linkers or curing agents may also be provided for promoting crosslinking of the epoxy resin composition to form a polymer composition. As with the epoxy resins, the additional cross-linkers and curing agents may be used individually or as a mixture of two or more. The curing agent component (also referred to as a cross-linker or cross-linking agent) may include any compound having an active group being reactive with the epoxy group of the epoxy resin. The curing agents may include nitrogen-containing compounds such as amines and their derivatives; oxygen-containing compounds such as carboxylic acid terminated polyesters, anhydrides, phenol novolacs, bisphenol-A novolacs, DCPD-phenol condensation products, brominated phenolic oligomers, amino-formaldehyde condensation products, phenol, bisphenol A and cresol novolacs, phenolic-terminated epoxy resins; sulfur-containing compounds such as polysulfides, polymercaptans; and catalytic curing agents such tertiary amines, Lewis acids, Lewis bases and combinations of two or more of the above curing agents. Practically, polyamines, diaminodiphenylsulfone and their isomers, aminobenzoates, various acid anhydrides, phenol-novolac resins and cresol-novolac resins, for example, may be used, but the present disclosure is not restricted to the use of these compounds.

Other embodiments of cross-linkers that may be used and include, for example, copolymers of styrene and maleic anhydride having a molecular weight (MW) in the range of from 1500 to 50,000 and an anhydride content of more than 15 percent.

Other components that may be useful in the compositions disclosed herein include curing catalysts. Examples of curing catalyst include imidazole derivatives, tertiary amines, ammonium salts, phosphonium salts, and organic metallic salts. Other examples of such curing catalysts include free radical initiators, such as azo compounds including azoisobutyronitrile, and organic peroxides, such as tertiary-butyl perbenzoate, tertiary-butyl peroctoate, and benzoyl peroxide; methyl ethyl ketone peroxide, acetoacetic peroxide, cumene hydroperoxide, cyclohexanone hydroperoxide, dicumyl peroxide, and mixtures thereof. Methyl ethyl ketone peroxide and benzoyl peroxide are preferably used in the present invention.

In some embodiments, curing agents may include primary and secondary polyamines and their adducts, anhydrides, and polyamides. For example, polyfunctional amines may include aliphatic amine compounds such as diethylene triamine (D.E.H. 20, available from The Dow Chemical Company, Midland, Mich.), triethylene tetramine (D.E.H. 24, available from The Dow Chemical Company, Midland, Mich.), tetraethylene pentamine (D.E.H. 26, available from the Dow Chemical Company, Midland, Mich.), as well as adducts of the above amines with epoxy resins, diluents, or other amine-reactive compounds. Aromatic amines, such as metaphenylene diamine and diamine diphenyl sulfone, aliphatic polyamines, such as amino ethyl piperazine and polyethylene polyamine, and aromatic polyamines, such as metaphenylene diamine, diamino diphenyl sulfone, and diethyltoluene diamine, may also be used.

In some embodiments, the phenol novolac cross-linker may contain a biphenyl or naphthyl moiety. The phenolic hydroxy groups may be attached to the biphenyl or naphthyl moiety of the compound. This type of cross-linker may be prepared, for example, according to the methods described in EP915118A1. For example, a cross-linker containing a biphenyl moiety may be prepared by reacting phenol with bismethoxy-methylene biphenyl.

In other embodiments, curing agents may include boron trifluoride monoethylamine, and diaminocyclohexane. Curing agents may also include imidazoles, their salts, and adducts. These epoxy curing agents are typically solid at room temperature. One example of suitable imidazole curing agents includes 2-phenylimidazole; other suitable imidazole curing agents are disclosed in EP906927A1. Other curing agents include aromatic amines, aliphatic amines, anhydrides, and phenols.

In some embodiments, the curing agents may be an amino compound having a molecular weight up to 500 per amino group, such as an aromatic amine or a guanidine derivative.

Examples of amino curing agents include 4-chlorophenyl-N, N-dimethyl-urea and 3,4-dichlorophenyl-N, N-dimethyl-urea.

Other examples of curing agents useful in embodiments disclosed herein include: 3,3'- and 4,4'-diaminodiphenylsulfone; methylenedianiline; bis(4-amino-3,5-dimethylphenyl)-1,4-diisopropylbenzene available as EPON 1062 from Shell Chemical Co.; and bis(4-aminophenyl)-1,4-diisopropylbenzene available as EPON 1061 from Shell Chemical Co.

Thiol curing agents for epoxy compounds may also be used. As used herein, "thiol" also includes polythiol or polymercaptan curing agents. Illustrative thiols include aliphatic thiols such as methanedithiol, propanedithiol, cyclohexanedithiol, 2-mercaptoethyl-2,3-dimercaptosuccinate, 2,3-dimercapto-1-propanol (2-mercaptoacetate), diethylene glycol bis(2-mercaptoacetate), 1,2-dimercaptopropyl methyl ether, bis(2-mercaptoethyl) ether, trimethylolpropane tris (thioglycolate), pentaerythritol tetra(mercaptopropionate), pentaerythritol tetra(thioglycolate), ethyleneglycol dithioglycolate, trimethylolpropane tris(beta-thiopropionate), tris-mercaptan derivative of tri-glycidyl ether of propoxylated alkane, and dipentaerythritol poly(beta-thiopropionate); halogen-substituted derivatives of the aliphatic thiols; aromatic thiols such as di-, tris- or tetra-mercaptobenzene, bis-, tris- or tetra-(mercaptoalkyl)benzene, dimercaptobiphenyl, toluenedithiol and naphthalenedithiol; halogen-substituted derivatives of the aromatic thiols; heterocyclic ring-containing thiols such as amino-4,6-dithiol-sym-triazine, alkoxy-4, 6-dithiol-sym-triazine, aryloxy-4,6-dithiol-sym-triazine and 1,3,5-tris(3-mercaptopropyl) isocyanurate; halogen-substituted derivatives of the heterocyclic ring-containing thiols; thiol compounds having at least two mercapto groups and containing sulfur atoms in addition to the mercapto groups such as bis-, tris- or tetra(mercaptoalkylthio) benzene, bis-, tris- or tetra(mercaptoalkylthio) alkane, bis(mercaptoalkyl) disulfide, hydroxyalkylsulfidebis(mercaptopropionate), hydroxyalkylsulfidebis(mercaptoacetate), mercaptoethyl ether bis(mercaptopropionate), 1,4-dithian-2,5-diolbis(mercaptoacetate), thiodiglycolic acid bis(mercaptoalkyl ester), thiodipropionic acid bis(2-mercaptoalkyl ester), 4,4-thiobutyric acid bis(2-mercaptoalkyl ester), 3,4-thiophenedithiol, bismuththiol and 2,5-dimercapto-1,3,4-thiadiazol.

The curing agent may also be a nucleophilic substance such as an amine, a tertiary phosphine, a quaternary ammonium salt with a nucleophilic anion, a quaternary phosphonium salt with a nucleophilic anion, an imidazole, a tertiary arsenium salt with a nucleophilic anion, and a tertiary sulfonium salt with a nucleophilic anion.

Aliphatic polyamines that are modified by adduction with epoxy resins, acrylonitrile, or (meth)acrylates may also be utilized as curing agents. In addition, various Mannich bases can be used. Aromatic amines wherein the amine groups are directly attached to the aromatic ring may also be used.

Quaternary ammonium salts with a nucleophilic anion useful as a curing agent in embodiments disclosed herein may include tetraethyl ammonium chloride, tetrapropyl ammonium acetate, hexyl trimethyl ammonium bromide, benzyl trimethyl ammonium cyanide, cetyl triethyl ammonium azide, N,N-dimethylpyrolidinium cyanate, N-methylpyridinium phenolate, N-methyl-o-chloropyridinium chloride, methyl viologen dichloride and the like.

Figure 4:
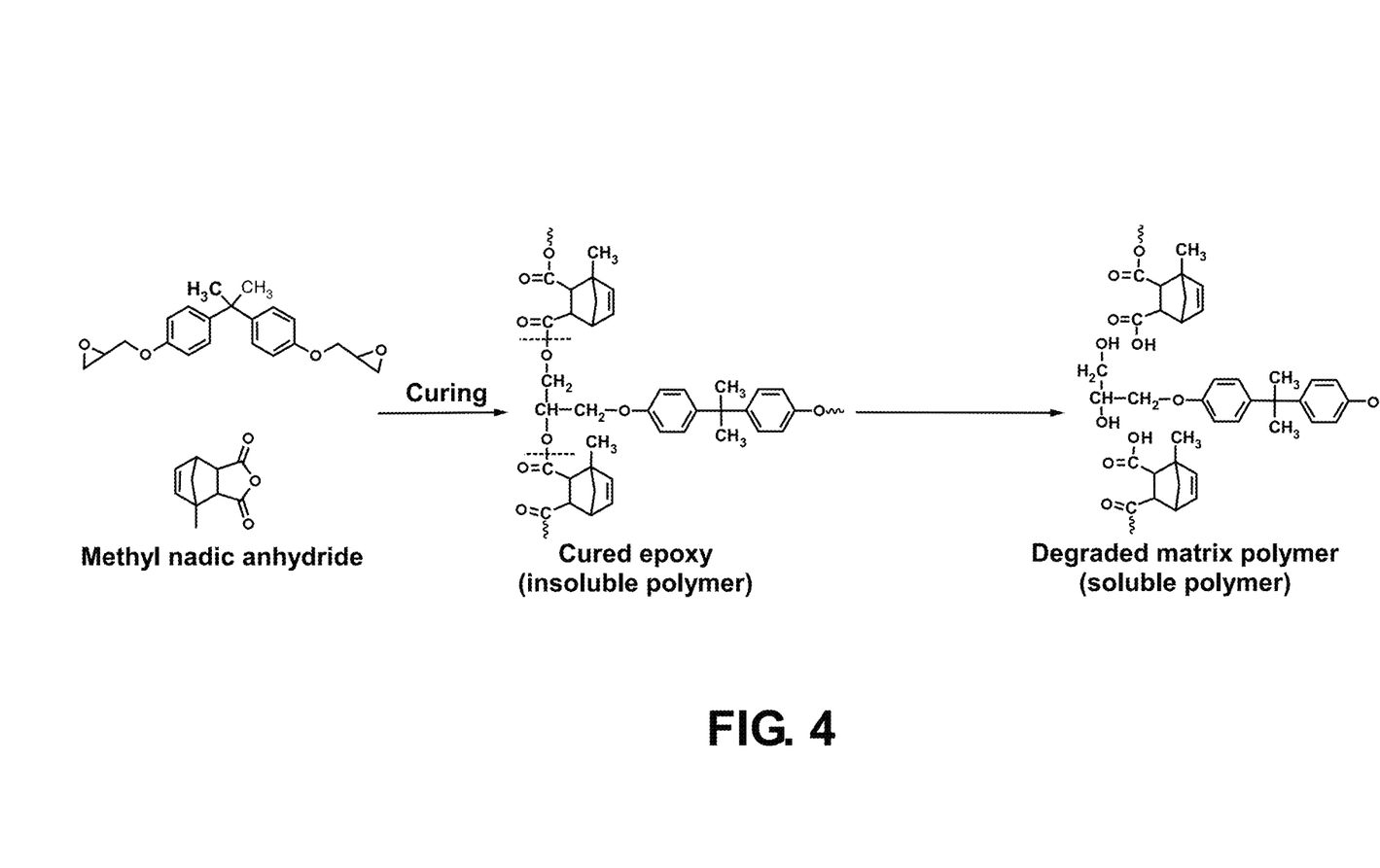
FIG. 4 shows a chemical reaction of BADGE epoxy resin with nadic methyl anhydride as cross-linker, its cure and hydrolysis.

It has been well reported that epoxy can be cured by various chemistry, including amine, acid, etc. In order to make epoxy degradable, acid anhydride may be used as cross-linker to introduce ester bond into cross-linked polymer chain (FIG. 4, Middle). Ester can be broken though hydrolysis process as shown in FIG. 4 right. This process is typically slow and requires extremely high temperature to activate. To make the degradable process suitable for downhole application, we add solid base (e.g., $Ca(OH)_2$, CaO, $Mg(OH)_2$, KOH, etc.) as catalyst or filler to accelerate hydrolysis process.

In some embodiments, at least one cationic photo initiator may be used. Cationic photo initiators include compounds that decompose when exposed to electromagnetic radiation of a particular wavelength or range of wavelengths to form a cationic species that may catalyze the polymerization reaction, such as between an epoxide group and a hydroxyl group. That cationic species may also catalyze the reaction of epoxide groups with other epoxide-reactive species contained in the curable composition (such as other hydroxyl groups, amine groups, phenolic groups, mercaptan groups, anhydride groups, carboxylic acid groups and the like). Examples of cationic photo initiators include diaryliodonium salts and triarylsulfonium salts. For example, a diaryliodonium salt type of photo initiator is available from Ciba-Geigy under the trade designation IRGACURE 250. A triarylsulfonium-type photo initiator is available from the Dow Chemical Company as CYRACURE 6992. The cationic photo initiator may be used in a catalytically effective amount, and may constitute up to about 10 weight percent of the curable composition.

B-Stage Process

As disused in the previous section, viscosity of putty composite raw material needs to be increased to at least 100,000 cP to avoid extrusion during setup (FIG. 1(c)). The only way to achieve this is to pre-crosslinked the raw material just below its gel point, a point where polymer is cross-linked into large molecules but not interconnected into continuous network. It can be typically realized through two methods. In method one, resin is blended with two kinds of cross linker (or catalyst), one that works at a low temperature, and one work at a high temperature. On the ground, the lower temperature cross-linker or catalyst is triggered to form "hard putty" raw material. The higher temperature cross-linker (catalyst) is saved for complete cross-linking in the downhole condition as a final stage. Another method is using only higher temperature catalyst or crosslinker, certain level of cross-linking can be achieved by keeping resin mixture in elevated temperature (below the designed main cross-linking temperature) for longer time, i.e., start cross-linking reaction at very low rate.

(3) Activated Complete Crosslinking

As discussed in previous section, a complete cross-linking process on the "B staged" composite material is critical in the last step to form a strong plug. This reaction needs to be inhibited before last step, otherwise composite putty cannot deform onto casing. Once deformed, this reaction needs to be finished as soon as possible to reduce tool setup time. Since downhole temperature is typically higher, a high temperature crosslinker or catalyst could be one of the options.

Another option is the so called latent cross linker or catalyst. Latent catalysts or cross-linker are defined as complexes that show little or no activity at particular (usually ambient) temperature and initiate only upon activation. This activation can be caused by a variety of different stimuli, including heat, pressure, etc. For example, $BF_3$ complexes, often in combination with diamino diphenylsulphone (DDS), can be used as heat latent cross linker to trigger cross-linker of epoxy resin when temperature reach around 160° C.

Lastly, catalyst can also be encapsulated with a protective shell and blended with resin. During composite deforming step in FIG. 1(c) and FIG. 3, shells are broken and catalyst is released to trigger complete reaction. This mechanism is similar to extended-release medications.

Catalysts to Promote Reaction

In some embodiments, a catalyst may be used to promote the reaction between the epoxy resin component and the curing agent or cross-linker, including dicyandiamide and the phenolic cross-linker described above. Catalysts may include a Lewis acid, for example boron trifluoride, conveniently as a derivative with an amine such as piperidine or methyl ethylamine. Catalysts may also be basic, such as, for example, an imidazole or an amine. Other catalysts may include other metal halide Lewis acids, including stannic chloride, zinc chloride, and the like, metal carboxylate-salts, such as stannous octoate and the like; benzyl dimethylamine; dimethyl aminomethyl phenol; and amines, such as triethylamine, imidazole derivatives, and the like.

Tertiary amine catalysts may be used. Illustrative tertiary amines include methyldiethanolamine, triethanolamine, diethylaminopropylamine, benzyldimethyl amine, m-xylylenedi (dimethylamine), N,N'-dimethylpiperazine, N-methylpyrolidine, N-methyl hydroxypiperidine, N,N,N'N'-tetramethyldiaminoethane, N, N,N',N',N'-pentamethyl-diethylenetriamine, tributyl amine, trimethyl amine, diethyldecyl amine, triethylene diamine, N-methyl morpholine, N,N, N'N'-tetramethyl propane diamine, N-methyl piperidine, N, N'-dimethyl-1,3-(4-piperidino) propane, pyridine and the like. Other tertiary amines include 1,8-diazobicyclo [5.4.0]-7-ene, 1,8-diazabicyclo[2.2.2]octane, 4-dimethylaminopyridine, 4-(N-pyrolidino)pyridine, triethyl amine and 2,4,6-tris(dimethylaminomethyl) phenol.

Catalysts to Help Degrade the Composite

As discussed previously, a solid base or solid acid including but not limited to $Ca(OH)_2$, CaO, $Mg(OH)_2$, KOH, NaOH, etc.

Toughening Agents

Toughening agents may be used to prevent the composites disclosed herein from becoming brittle when the epoxy resin cures. In some embodiments, toughening agents may be rubber compounds and block copolymers.

Toughening agents function by forming a secondary phase within the polymer matrix. This secondary phase is rubbery and hence is capable of crack growth arrestment, providing improved impact toughness.

Toughening agents used to improve fracture toughness of epoxies include FORTEGRA 100, block copolymers, CTBN, amphiphilic block copolymers, linear polybutadiene-polyacrylonitrile copolymers, oligomeric polysiloxanes, and organopolysiloxane resins. Other toughening agents may include carboxyl terminated butadiene, polysulfide-based toughening agents, amine-terminated butadiene nitrile, and polythioethers.

The amount of toughening agent used in the curable compositions described herein may depend on a variety of factors including the equivalent weight of the polymers, as well as the desired properties of the products made from the composition. In general, the amount of toughening agent may be from 0.1 weight percent to 30 weight percent in some embodiments, from 0.5 weight percent to 10 weight percent in other embodiments, and from 1 weight percent to 5 weight percent in yet other embodiments, based on the total weight of the curable composition.

Optional Additives

Curable compositions and thermoset resins disclosed herein may optionally include conventional additives and fillers. Additives and fillers may include, for example, other flame retardants, boric acid, silica, glass, talc, metal powders, titanium dioxide, wetting agents, pigments, coloring agents, mold release agents, coupling agents, ion scavengers, UV stabilizers, flexibilizing agents, and tackifying agents. Additives and fillers may also include fumed silica, aggregates such as glass beads, polytetrafluoroethylene, polyol resins, polyester resins, phenolic resins, graphite, molybdenum disulfide, abrasive pigments, viscosity reducing agents, boron nitride, mica, nucleating agents, and stabilizers, among others. Fillers and modifiers may be preheated to drive off moisture prior to addition to the epoxy resin composition. Additionally, these optional additives may have an effect on the properties of the composition, before and/or after curing, and should be considered when formulating the composition and the desired reaction product. Curable compositions disclosed herein may also optionally contain other additives of a generally conventional type including for example, stabilizers, other organic or inorganic additives, pigments, wetting agents, flow modifiers, UV light blockers, and fluorescent additives. These additives may be present in amounts of from 0 to 5 weight-percent in some embodiments, and less than 3 weight percent in other embodiments. Examples of suitable additives are also described in U.S. Pat. No. 5,066,735 and PCT/US2005/017954.

Curable Compositions

Curable compositions may be formed by combining a mixture of a) an aromatic epoxy resin, b) a catalyst, and c) an anhydride cross-linker. An aromatic epoxy resin may include an epoxy phenolic novolac resin, an epoxy bisphenol A novolac resin, a multifunctional epoxy resin, a bisphenol-A or bisphenol F based epoxy resin, and a polyether polyol, for example. Additional cross-linkers, epoxy resins, catalysts, toughening agents and other additives may also be added, as described above. The relative proportions of the epoxy resin mixtures and the cycloaliphatic anhydride cross-linker may depend, in part, upon the properties desired in the curable composition or thermoset compositions to be produced, the desired cure response of the composition, and the desired storage stability of the composition (desired shelf life).

In some embodiments, the epoxy resin mixture (a mixture of aromatic epoxy and other epoxy resins as described above) may be present in the curable composition in an amount ranging from about 0.1 to about 99 weight percent of the curable composition, based on the total weight of the epoxy resin mixture, the catalyst and the anhydride cross-linker.

In other embodiments, the epoxy composition may range from about 5 to about 95 weight percent of the curable composition; from about 15 to about 85 weight percent in other embodiments; from about 25 to about 75 weight percent in other embodiments; from about 35 to about 65 weight percent in other embodiments; and from about 40 to about 60 weight percent in yet other embodiments, where the above percentages are based on the total weight of the epoxy resin mixture, the catalyst, and the cycloaliphatic anhydride cross-linker.

In some embodiments, the anhydride cross-linker, such as cycloaliphatic cross-linkers, or a mixture of cycloaliphatic anhydride cross-linkers may be present in the curable composition in an amount ranging from 0.1 to 99 weight percent of the curable composition, based on the total weight of the epoxy resin mixture, the catalyst, and the cycloaliphatic anhydride cross-linker. In other embodiments, the cycloaliphatic anhydride cross-linker may range from 5 to 95 weight percent of the curable composition; from 15 to 85 weight percent in other embodiments; from 25 to 75 weight percent in other embodiments; from 35 to 65 weight percent in other embodiments; and from 40 to 60 weight percent in yet other embodiments, where the above percentages are based on the total weight of the epoxy resin mixture, the catalyst, and the cycloaliphatic anhydride cross-linker.

In some embodiments, a catalyst may be present in the curable composition in an amount ranging from 1 weight percent to 40 weight percent. In other embodiments, the catalyst may be present in an amount ranging from 2 weight percent to 30 weight percent; from 5 weight percent to 25 weight percent in other embodiments; and from 8 to 20 weight percent in yet other embodiments, where the above ranges are based on the total weight of the epoxy resin mixture, the catalyst, and the cycloaliphatic anhydride cross-linker.

Additional epoxy resins may be used in some embodiments of the curable compositions in an amount ranging from 0.01 weight percent to 20 weight percent, based on the total weight of the curable composition. In other embodiments, additional epoxy resins may be present in an amount ranging from 0.1 weight percent to 8 weight percent; from 0.5 weight percent to 6 weight percent in other embodiments; and from 1 to 4 weight percent in yet other embodiments.

Additional cross-linkers may be used in some embodiments of the curable compositions in an amount ranging from 0.01 weight percent to 20 weight percent, based on the total weight of the curable composition. In other embodiments, additional cross-linkers may be present in an amount ranging from 0.1 weight percent to 8 weight percent; from 0.5 weight percent to 6 weight percent in other embodiments; and from 1 to 4 weight percent in yet other embodiments.

Curable compositions may also include from about 0.1 to about 50 volume percent optional additives in some embodiments, based on the total volume of the curable composition. In other embodiments, curable compositions may include from about 0.1 to about 5 volume percent optional additives; and from about 0.5 to about 2.5 volume percent optional additives in yet other embodiments.

Composites And Coated Structures

In some embodiments, composites may be formed by curing the curable compositions disclosed herein. In other embodiments, composites may be formed by applying a curable composition to a substrate or a reinforcing material, such as by impregnating or coating the substrate or reinforcing material, and curing the curable composition.

The above described curable compositions may be in the form of a powder, slurry, or a liquid. After a curable composition has been produced, as described above, it may be disposed on, in, or between the above described substrates, before, during, or after cure of the curable composition.

For example, a composite may be formed by coating a substrate with a curable composition. Coating may be performed by various procedures, including spray coating, curtain flow coating, coating with a roll coater or a gravure coater, brush coating, and dipping or immersion coating.

In various embodiments, the substrate may be monolayer or multi-layer. For example, the substrate may be a composite of two alloys, a multi-layered polymeric article, and a metal-coated polymer, among others, for example. In other various embodiments, one or more layers of the curable composition may be disposed on or in a substrate. Other multi-layer composites, formed by various combinations of substrate layers and curable composition layers are also envisaged herein.

In some embodiments, the heating of the curable composition may be localized, such as to avoid overheating of a temperature-sensitive substrate, for example. In other embodiments, the heating may include heating the substrate and the curable composition.

Curing of the curable compositions disclosed herein may require a temperature of at least about 30° C., up to about 250° C., for periods of minutes up to hours, depending on the resin composition, cross-linker, and catalyst, if used. In other embodiments, curing may occur at a temperature of at least about 100° C., for periods of minutes up to hours. Post-treatments may be used as well, such post-treatments ordinarily being at temperatures between about 100° C. and 250° C.

In some embodiments, curing may be staged to prevent exotherms. Staging, for example, includes curing for a period of time at a temperature followed by curing for a period of time at a higher temperature. Staged curing may include two or more curing stages, and may commence at temperatures below about 180° C. in some embodiments, and below about 150° C. in other embodiments.

In some embodiments, curing temperatures may range from a lower limit of about 30° C., about 40° C., about 50° C., about 60° C., about 70° C., about 80° C., about 90° C., about 100° C., about 110° C., about 120° C., about 130° C., about 140° C., about 150° C., about 160° C., about 170° C., or about 180° C. to an upper limit of about 250° C., about 240° C., about 230° C., about 220° C., about 210° C., about 200° C., about 190° C., about 180° C., about 170° C., about 160° C., where the range may be from any lower limit to any upper limit.

Various processing techniques can be used to form composites containing the epoxy-based compositions disclosed herein. For example, filament winding, solvent prepregging, and pultrusion are typical processing techniques in which the uncured epoxy resin may be used. Moreover, fibers in the form of bundles may be coated with the uncured epoxy resin composition, laid up as by filament winding, and cured to form a composite.

Experiment

Figure 5:
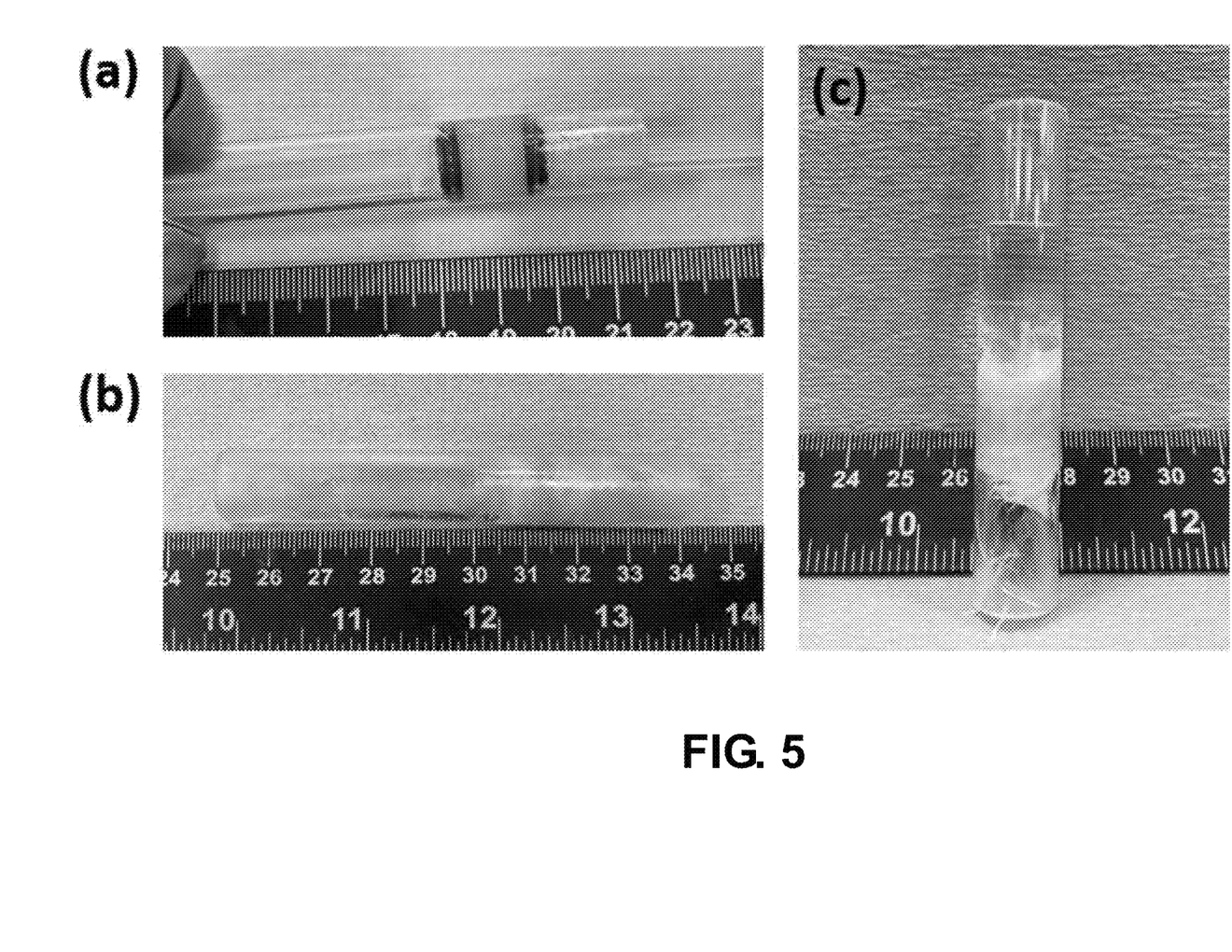
FIG. 5(a) illustrates a method of making in-situ degradable plug by using a composite putty in polycarbonate tube.
FIG. 5(b) illustrates a product after curing the intermediate made from FIG. 5(a) under an elevated temperature.
FIG. 5(c) illustrates an effectiveness of the dissolvable plug made from FIG. 5(b) loaded with water on the top section for 30 minutes.

A degradable composite was made from degradable resin, chopped glass fiber, fume silica powder thicker agent, acidic degradation-accelerating agent, and high temperature cure-catalyst, and "B Staged" into a hard but still ductile putty, as shown in FIG. 2(b). This composite putty was loaded into a transparent polycarbonate tube (i.e., represents casing), and compressed into a plug by two backups (simulated by two syringe piston, FIG. 5(a)). Although there was a gap between rubber stopper of syringe piston and tube ID, no severe extrusion was observed because the high viscosity of composite putty as well as blockage from chopped fibers. After removing backup (i.e., syringe piston), the plug was cured into a solid plug piece at elevated temperature even without compressive loading (FIG. 6(b)). Water was loaded on the top section for 30 mins, and the bottom section is found dry all the time, which means there is no gap formed during cross-linking process. It was true that polymer typically shrink in the volume during cross-linking, but the strong adhesive bonding between thermoset resin and tube ID obviously prevent formation of any gaps between plug and "casing". This test showed that this concept was effective.

Figure 6:
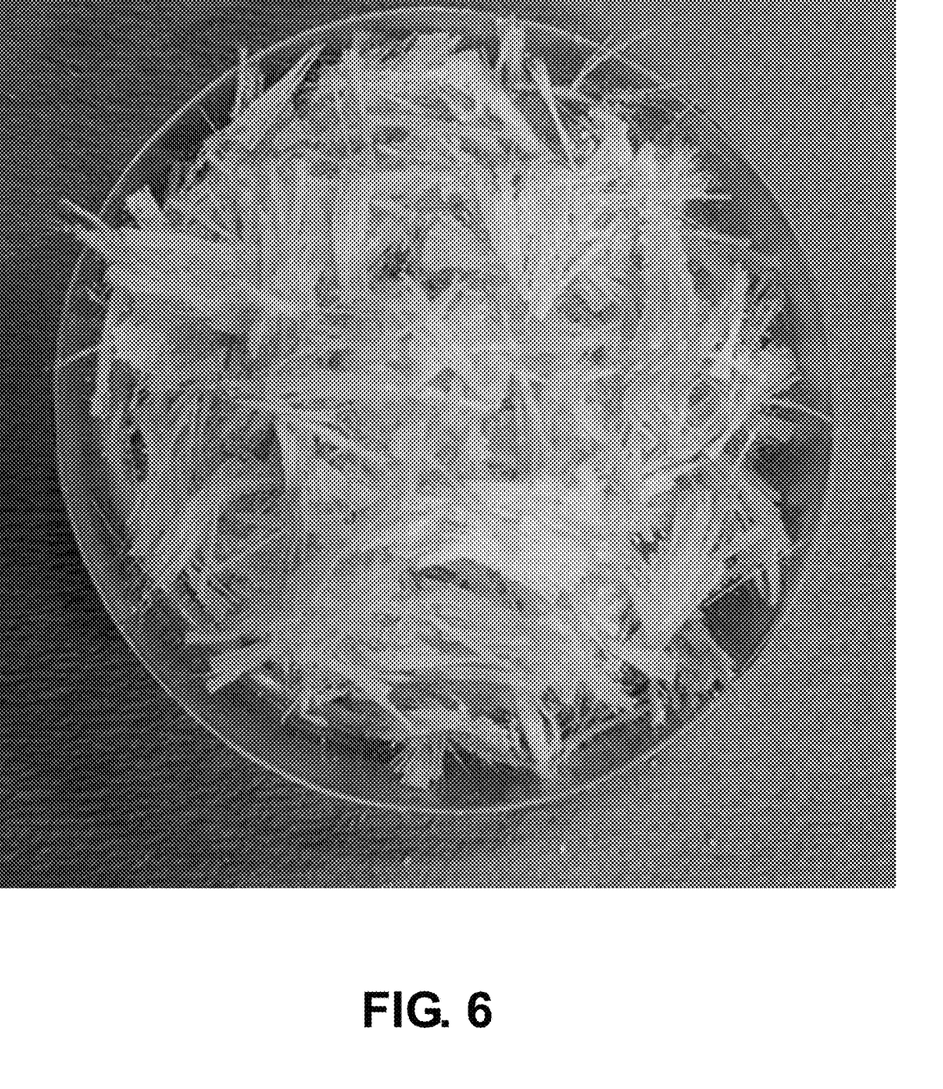
FIG. 6 shows a result after soaking the dissolvable plug from FIG. 5(b) in downhole fluids (i.e., 3% KCl solution) at 95° C. for 3 days.

After soaking in downhole fluids (i.e., 3% KCl solution) at 95° C. for 3 days, resin of high strength composite materials degrades completely, leaving chopped fibers behind as shown in FIG. 6.

The above shows and describes the basic principles, main features and advantages of the utility patent application. Those skilled in the industry should understand that the present utility patent application is not limited by the above-mentioned embodiments. The above-mentioned embodiments and the description are only preferred examples of the present utility patent application and are not intended to limit the present utility patent application, without departing from the present utility patent application. Under the premise of spirit and scope, the present utility patent application will have various changes and improvements, and these changes and improvements fall within the scope of the claimed utility patent application. The scope of protection claimed by the utility patent application is defined by the appended claims and their equivalents.

We claim:

1. An in-situ dissolvable plug useable for isolating sections of a wellbore, comprising:
   a cylindrical body having a backup piece at least at one end of the cylindrical body; and
   a tube extends through the cylindrical body and backup piece;
   wherein the cylindrical body is made of dissolvable curable material, wherein the cylindrical body comprises an external surface, and an inner bore surface formed around the tube, wherein the cylindrical body is soft, moldable, and expandable in a direction from a starting point of the inner bore surface to the external surface that is perpendicular to the tube outer surface and in a direction away from the tube, wherein the backup piece is movable toward to the cylindrical body to squeeze the dissolvable curable material to expand and cure in-situ from the inner bore surface to the external surface to manufacture the plug in-situ in the downhole condition, wherein the dissolvable material comprises polymer material, wherein the polymer materials comprise a reaction product of an epoxy resin mixture, a cross-linker, a degradation catalyst, and viscosity enhancer, wherein the degradation catalyst is a controlled release catalyst and capped by a shell.

2. The in-situ dissolvable plug of claim 1, wherein backup piece is expandable in a direction from a starting point of the inner bore surface to the external surface that is perpendicular to the tube outer surface and in a direction away from the tube upon a trigger action.

3. The in-situ dissolvable plug of claim 1, wherein the polymer materials comprise a fiber enhancement.

4. The in-situ dissolvable plug of claim 1, wherein the plug comprises a first axis, wherein the tube has a second axis, wherein the first axis and the second axis coincide.

* * * * *